2,798,888
          Patented July 9, 1957

2,798,888
INDENE AND INDANE COMPOUNDS AND THEIR PRODUCTION

Hellmut Ueberwasser, Chrischonaweg, Switzerland, assignor to Ciba Pharmaceutical Products, Inc., Summit, N. J.

No Drawing. Application August 11, 1953,
Serial No. 373,657

Claims priority, application Switzerland August 12, 1952

5 Claims. (Cl. 260—570.8)

The present invention relates to the manufacture of 1-amino-alkyl-1-R-3-R₁-indenes and the corresponding indanes, wherein R and R₁ stand for organic radicals. Organic radicals are for instance aliphatic radicals, such as alkyl groups, e. g. methyl, ethyl, propyl, isopropyl, or ethylbutyl groups, cyano or carbalkoxy groups, e. g. carbomethoxy, or carboethoxy, or acyl groups, e. g. acetyl propionyl or butyryl; or carbocyclic radicals, such as phenyl radicals, e. g. alkoxyphenyl, such as lower alkoxyphenyl, for example dimethoxyphenyl, or halophenyl, such as chloro- or bromophenyl, or cycloaliphatic radicals, e. g. cyclohexyl or cyclohexenyl radicals; or heterocyclic radicals, for example pyridyl, thienyl or furyl radicals; or araliphatic or heterocyclic-aliphatic radicals, e. g. benzyl, furfuryl or benzoyl radicals. Advantageously, R and R₁ are nitrogen-free organic radicals and represent especially 6-membered carbocyclic radicals, such as phenyl or cyclohexyl radicals, or benzyl radicals, or simultaneously represent a 6-membered carbocylic radical, such as mentioned above and either a benzyl or an alkyl, e. g. methyl, radical; or simultaneously represent a benzyl and an alkyl radical; or simultaneously represent a nitrogen-free 5-membered heterocyclic e. g. thienyl or furyl and an alkyl e. g. methyl radical; or simultaneously represent a 5-membered nitrogen-free heterocyclyl-methyl, e. g. thenyl or furfuryl and an alkyl, e. g. methyl radical.

The aforesaid indane and indene compounds may also contain further substituents, for example in the benzene nuclei, such as lower alkoxy, e. g. methoxy groups, or in 2-position, e. g. lower alkyl groups, for instance methyl. The aminoalkyl group is advantageously a tertiary aminoalkyl group, for example a lower dialkylamino-lower alkyl group or an alkylene-amino-lower alkyl group, such as a dimethylamino-, diethylamino-, piperidino-, morpholino- or pyrrolidino- lower alkyl group, primarily a lower dialkylamino-ethyl or alkylene-amino-ethyl group, especially β-diethylamino-ethyl group.

The invention also embraces the salts of the aforesaid compounds as well as novel intermediate products.

Of particular interest are 1-tertiary amino-lower alkyl-1-R-3-R₁-indanes, especially 1-(β-diethylamino-ethyl)-1-R-3-R₁-indanes, wherein R and R₁ represents simultaneously a phenyl and a methyl radical, primarily those wherein R represents a phenyl and R₁ a methyl radical; in these compounds the benzene nuclei are unsubstituted or contain methoxy groups. Most valuable are the 1-(β-diethylamino-ethyl)-1-phenyl-3-methyl-5,6-dimethoxy-indane of the formula

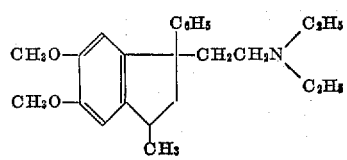

and also the 1-(β-diethylamino-ethyl)-1-(3',4'-dimethoxyphenyl)-3-methyl-5,6-dimethoxy-indane of the formula

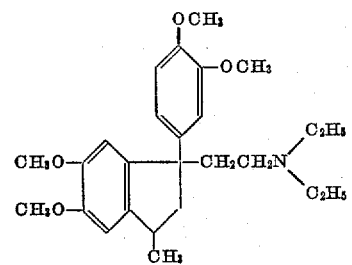

and their salts.

Compounds of the present invention are useful as medicaments, more particularly as spasmolytics and vasodilators. The new compounds possess valuable pharmacological properties. Thus they possess excellent spasmolytic activity. Some of them, such as 1-(β-diethylamino-ethyl)-1-phenyl-3-methyl-indane, in addition exhibit a dilating effect on the coronary blood vessels. This effect is the more surprising since aminoalkyl-indene and -indane compounds, of which the aminoalkyl group is in 2-position possess an uterotonic activity. It is also known that the 1-(β-diethylamino-ethyl)-indene, which is described in the laterature, possesses no spasmolytic effect but exerts a detrimental effect upon the circulation.

The new indene and indane compounds are prepared by condensing a 1-R-3-R₁-indene, or a 1-R-3-R₁-indane, which contains in either the 1- or 3-position a cyano group with a reactive ester of an amino-alkanol, especially of the hydrohalic acids, R and R₁ having the same meaning as above.

The reaction is preferably carried out in the presence of inert solvents, such as benzene, toluene or xylene, and advantageously in the presence of a condensing agent such as alkali metals or their amides, hydrides or hydrocarbon compounds.

The new indene and indane compounds having a 1-aminopropyl group may be also prepared by condensing a 1-R-3-R₁-indene with acrylonitrile, advantageously in the presence of t-butanol and a strong organic base, e. g. benzyl-trimethyl-ammonium hydroxide and reducing in the obtained 1-cyanoethyl-1-R-3-R₁-indene the cyano group with hydrogen in the presence of Raney nickel. The 1-primary amino-propyl-indenes thus obtained can be converted into 1-tertiary-amino-propyl-indenes by alkylation of the amino group or by converting the amino group via the hydroxyl group into a halogen atom e. g. chlorine, and reacting the 1-γ-chloro-propyl-indenes thus obtained with tertiary amines, e. g. piperidine, the reaction mentioned being carried out in a conventional manner.

The resulting 1-aminoalkyl-1-R-3-R₁-indenes or 1-aminoalkyl-1-R-3-R₁-indenes or the resulting 1-aminoalkyl-1-R-3-R₁-indenes or indanes containing a cycloalkylidene or cycloalkenyl group may then be reduced by means of reducing agents to form the corresponding indanes or cycloalkylindenes or -indanes.

Furthermore, a cyano group present in 1- or 3-position be converted in a conventional manner by hydrolysis and of resulting 1-aminoalkyl-1-R-3-R₁-indenes or -indanes can esterification into a carbalkoxy group e. g. carbethoxy group, and or such a carbalkoxy group by reaction with a Grignard-compound into an acyl group, e. g. propionyl or benzoyl group.

According to the method of working, the new compounds are obtained in the form of the free bases or their salts. From the free bases salts can be obtained by reaction with acids which are suitable for the production of non-toxic or therapeutically applicable salts, as for example the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid, or from therapeutically active acids.

The present invention also extends to those modifications of the process in which there is used as starting material a compound obtainable as an intermediate product in the said process and in which the remaining stages of the process are carried out.

The following examples illustrate the invention, the relation between parts by weight and parts by volume being the same as that between the gram and the cubic centimeter:

*Example 1*

21 parts by weight of 1-phenyl-3-methyl-indene are dissolved in 100 parts by volume of toluene and with stirring, consecutively, 6 parts by weight of finely ground commercial sodamide and then 15 parts by weight of β-chlorethyl-diethylamine are added. The reaction is accelerated by heating to 50–60° C. but care is taken, by external cooling as necessary, that the reaction temperature remains below 70° C. After the spontaneous reaction has subsided, heating is continued under reflux for a further hour with stirring. After cooling, the reaction mixture is treated carefully with water and then the aqueous layer separated off. The basic constituents are then extracted from the toluene solution by shaking with dilute hydrochloric acid. The hydrochloric acid solution produced is extracted by shaking with ether for the removal of the residual neutral fractions and then, with ice cooling, rendered alkaline with caustic soda solution. The crude base is taken up in ether and dried with potassium carbonate. After the removal of the ether, the 1 - (β-diethylamino - ethyl)-1-phenyl-3-methyl-indene obtained is purified by distillation; it boils at 127° C. under 0.03 mm. pressure.

10 parts by weight of the indene base thus obtained are dissolved in 15 parts by volume of ethyl alcohol and with the addition of 10 parts by weight of nickel catalyst (prepared according to Rupe et al. Helv. Chim. Acta 1, 453–455 (1918)), shaken in a closed vessel at an initial pressure of 10 atmospheres of hydrogen and at a temperature of 90–100° C. After the taking up of one equivalent of hydrogen, the hydrogenation comes to a standstill and after separation of the catalyst and removal of the solvent there remains the 1-(β-diethylamino-ethyl)-1-phenyl-3-methyl-indane of the formula

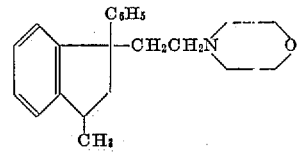

as a colourless oil of boiling point 121° C. under 0.03 mm. pressure.

*Example 2*

When there are used instead of the β-chlorethyldiethylamine of Example 1, 16 parts by weight of N-β-chlorethyl piperidine, there is first obtained the 1-(β-piperidino-ethyl)-1-phenyl-3-methyl-indene of boiling point 141° C. under 0.03 mm. pressure and from this, by hydrogenation under the same conditions, the 1-(β-piperidino-ethyl)-1-phenyl-3-methyl-indene of the formula

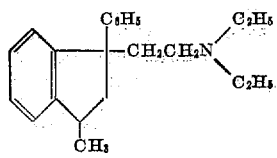

as a colorless oil of boiling point 135° C. under 0.04 mm. pressure.

*Example 3*

When the β-chlorethyl-diethylamine of Example 1 is replaced by 16 parts by weight of β-chlorethyl-morpholine, then by analogous methods of working there are obtained the 1-(β-morpholino-ethyl)-1-phenyl-3-methyl-indene of boiling point 160° C. under 0.045 mm. pressure and the 1-(β-morpholino-ethyl)-1-phenyl-3-methyl-indene of the formula

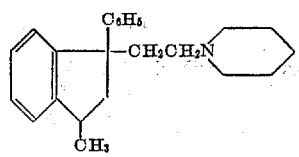

of boiling point 149° C. under 0.03 mm. pressure.

The 1-phenyl-3-methyl-indene, which has a melting point of 59° C., used in Examples 1 to 3, can be obtained in the following way:

86 parts by weight of 3-phenyl-indanone dissolved in 130 parts of volume of toluene are gradually added to a Grignard solution prepared from 12 parts by weight of magnesium shavings in 400 parts by volume of ether by introducing gaseous methyl bromide. After heating for ½ hour under reflux, the reaction mixture is decomposed with ice to which 30 parts by volume of concentrated sulfuric acid have been added. After adding ether, the organic layer is separated off, washed with water and freed from ether by distillation. The toluene solution remaining behind is then heated further with 8 parts by weight of 2:5-dichloro-benzene-sulfonic acid, whereby an azeotropic mixture of toluene and water is distilled over, while the temperature in the reaction mixture should not exceed 140° C. and this maximum temperature should not be maintained for longer than 15 minutes. The residue is dissolved in benzene, freed from any acid portions by washing with 2-normal sodium carbonate solution and, after evaporating the benzene, purified by distillation. The 1-phenyl-3-methyl-indene boils at 89°–92° C. under a pressure of 0.04 mm. of mercury and solidifies to crystals on cooling.

*Example 4*

426 parts by weight of 1-phenyl-3-methyl-5:6-dimethoxy-indene and 218 parts by weight of β-chlorethyl-diethylamine are dissolved in 1000 parts by volume of toluene and within a temperature range rising from 55° C. to 95° C. during the reaction, 85 parts by weight of finely ground commercial sodamide are added in portions. Stirring is then continued for an hour at 95–105° C. After cooling, there are added to the reaction mixture with stirring first 150 parts by volume of alcohol in portions, after which without danger so much water can be added as is necessary for the solution of the inorganic reaction products. Separation is effected from the toluene layer, from which then the basic reaction products are extracted by shaking several times with 2-normal hydrochloric acid. The hydrochloric acid solution is diluted with an equal volume of water and then extracted with benzene in the hot for removal of neutral products also dissolved, followed by rendering alkaline with caustic soda solution with cooling. Thereupon the crude base is taken up in ether and, after drying with potassium carbonate, distilled. There is thus obtained the 1 - (β - diethylamino-ethyl)-1-phenyl-3-methyl-5:6-dimethoxy-indene, which boils at 182° C. under 0.17 mm. pressure and is obtained from petrol ether in crystals of melting point 82° C.

465 parts by weight of the dimethoxy-indene base obtained are dissolved in 400 parts by volume of methanol and 600 parts by volume of glacial acetic acid and after the addition of 20 parts by weight of palladium carbon (10 percent Pd) shaken in a hydrogen atmosphere at 33–37° C. The hydrogenation comes to a standstill after the taking up of one equivalent of hydrogen. The catalyst is filtered off, the majority of the solvent removed under reduced pressure and the residue taken up in a little water and there is obtained therefrom by rendering alkaline with caustic soda solution, taking up in ether and distillation, the 1 - ($\beta$ - diethylamino - ethyl)-1-phenyl-3-methyl-5:6-dimethoxy-indane of the formula

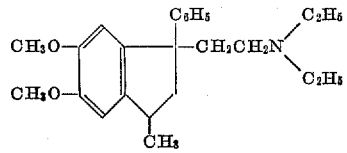

as a colorless oil of boiling point 162° C. under 0.08 mm. pressure. The hydrochloride of this compound (prepared by adding 12 N hydrochloric acid to an alcoholic solution of the distilled base until pH becomes 5.5, then evaporating the solvents) forms colorless crystals which, when recrystallised from a mixture of alcohol and ethyl acetate or from water possess the melting point 210° C.

The 1-phenyl-3-methyl-5:6-dimethoxy-indene, which has a melting point of 101° C., used in this example, can be prepared in the following manner:

900 parts by weight of cinnamic acid and 1860 parts of volume of veratrol are preheated in a stirring vessel to 90° C. Sulfuric acid prepared from 110 parts by weight of ice and 340 parts by volume of concentrated sulfuric acid are then stirred in in such a way that a reaction temperature of 99° C. is reached fairly rapidly, whereupon, by adding the acid more slowly and by external cooling, the reaction temperature is controlled in such a way that it only rises slowly to 103–104° C. After allowing the whole to cool slowly to 80° C., the reaction mixture is stirred into 2000 parts by weight of ice and 4000 parts by volume of water and then extracted with ether by stirring. After separating the ethereal solution, the acid portions are removed from it by extraction with stirring with 2-normal sodium hydroxide solution and the unused veratrol is recovered by distilling off the ether. From the alkaline solution there is obtained by rendering acid with concentrated hydrochloric acid and extracting with ether an acid mixture, from which there is separated by distillation under a pressure of 0.1 mm. of mercury a fraction of 175–195° C. as main product. The $\beta$-phenyl-$\beta$-veratryl-propionic acid thus purified is suitable for further working up; when recrystallised from a mixture of benzene and hexane it melts at 106° C. 775 parts by weight of $\beta$-phenyl-$\beta$-veratryl-propionic acid are reacted with 600 parts by volume of thionyl chloride in 1500 parts by volume of benzene for 3 hours in a heating bath of 65° C.; at the same bath temperature benzene and any excess thionyl chloride are distilled off and the acid chloride formed is left for about another 12 hours in a vacuum at 65° C. until constancy of weight is reached. The crude acid chloride is then dissolved in 1.3 times the quantity by weight of benzene, treated with 1100 parts by volume of stannic-tetrachloride while cooling with a mixture of ice and sodium chloride, taking care that too high temperatures do not occur within the solidifying stannic-tetrachloride reaction complex, which immediately separates off in the cold. In place of the stannic-tetrachloride there may be used 600 parts by weight of fine-grained aluminium chloride whereby the reaction temperature is kept below 45° C. by external cooling. The working up to 3-phenyl-5:6-dimethoxy-indanone takes place in both cases by decomposing the reaction mixture with ice and hydrochloric acid, separating and washing the benzene solution consecutively with dilute hydrochloric acid and sodium carbonate solution. The crude product obtained by concentrating the benzene solution is purified by distillation; it boils at 153° C. under a pressure of 0.025 mm. of mercury or at 174° C. under a pressure of 0.18 mm. of mercury. The 3-phenyl-5:6-dimethoxy-indanone recrystallised from alcohol melts at 108° C.

330 parts by weight of 3-phenyl-5:6-dimethoxy-indanone dissolved in 1000 parts by volume of benzene are added to a Grignard solution diluted with 600 parts by volume of benzene, and prepared from 46 parts by weight of magnesium in 1000 parts by volume of ether by introducing methyl bromide.

To finish the reaction the whole is stirred for ½ hour while heating with a bath of 45° C. The Grignard reaction mixture is decomposed by stirring in 1000 parts by volume of 2 normal sulfuric acid. The crude product obtained by concentration from the benzene layer splits off water on heating. The 1-phenyl-3-methyl-5:6-dimethoxy-indene thus formed boils at 132° C. under a pressure of 0.03 mm. of mercury or at 153° C. under a pressure of 0.15 mm. of mercury. It crystallises from hexane at the above mentioned melting point.

*Example 5*

143 parts by weight of 1-(3':4'-dimethoxy-phenyl)-3-methyl-5:6-dimethoxy-indene and 61 parts by volume of $\beta$-chlorethyl-diethylamine are dissolved in 500 parts by volume of toluene and 21 parts by weight of finely ground commercial sodamide are stirred in in portions, the temperature being allowed to rise from 50 to 90° C. Stirring is then continued for a further hour at 105° C. After cooling and addition of some alcohol, the whole is treated with water, the aqueous layer separated from organic layer and the latter extracted several times by shaking with 1-normal hydrochloric acid. From the hydrochloric acid solution which has been washed with ether, the 1-($\beta$ - diethylamino-ethyl) - 1 - (3':4'-dimethoxy-phenyl)-3-methyl-5:6-dimethoxy-indene is obtained by rendering alkaline, taking up in ether, drying and distilling, in the form of a practically colorless oil of boiling point 187° C. under 0.1 mm. pressure. The picrate of this compound prepared by mixing at 50° C. alcoholic solutions of equivalent amounts of the base and of picric acid melts at 154° C.

80 parts by weight of the indene base obtained are dissolved in 300 parts by volume of glacial acetic acid and 50 parts by volume of methanol and shaken in a hydrogen atmosphere with 10 parts by weight of palladium carbon (10 percent Pd). At a temperature of 26–30° C., within a short time, one equivalent of hydrogen is taken up. Working up follows by separation from the catalyst, considerable concentration of the acetic acid solution under reduced pressure and stirring the residue with a small excess of concentrated aqueous hydrochloric acid. In this manner, the hydrochloride of the 1-($\beta$-diethyl-amino-ethyl)-1-(3':4'-dimethoxy-phenyl)-3-methyl-5:6-dimethoxyindane) of the formula

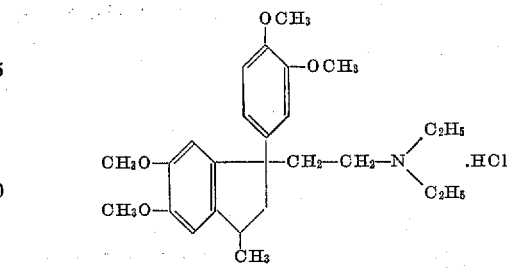

is separated in an excellent degree of purity as colorless crystals, which, when recrystallised from 80 percent alcohol, melt at 271° C.

The 1-(3':4'-dimethoxy-phenyl)-3-methyl-5:6-dimethoxyindene used as starting material was obtained by reacting in the manner described in Example 4 190 parts by weight of 3-(3':4'-dimethoxy-phenyl) - 3 - methyl-5:6-dimethoxy-indanone dissolved in 600 parts by volume of benzene with a Grignard solution prepared from 16 parts by weight of magnesium in 300 parts by volume of ether by introducing methyl-bromide. It boils at 187° C. under a pressure of 0.1 mm. of mercury.

Example 6

17 parts by weight of 1-thienyl-3-methyl-indene are dissolved in 30 parts by volume of toluene and 6 parts by weight of finely ground sodamide added. The mixture is stirred for ¼ hour at 70 to 75° C. After cooling to 55° C., 13 parts by weight of β-chlorethyl-diethylamine, dissolved in 12 parts by volume of toluene, are stirred in within 40 minutes, in which operation this temperature may be allowed to rise to 80° C. After the subsiding of the spontaneous reaction the whole is further heated for a short time under reflux. After cooling, the whole is treated very carefully with water, the aqueous layer separated from the toluene layer and the latter extracted by shaking with dilute hydrochloric acid. After washing with ether, the hydrochloric acid solution containing 1 - (β-diethyl-amino-ethyl)-1-thienyl-3-methyl-indene hydrochloride is rendered alkaline with cooling and by taking up in ether, drying and distilling, the 1-(β-diethylamino-ethyl)-1-thienyl - 3 - methyl-indene of the formula

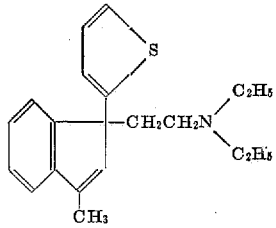

obtained at 127° C. under 0.04 mm. pressure.

The 1-thienyl-3-methyl-indene used above can be obtained in the following way:

50 parts by weight of 3-methyl-indanone dissolved in 60 parts by volume of ether are added to a Grignard solution prepared from 80 parts by weight of 2-iodothiophen and 11 parts by weight of magnesium in 150 parts by volume of ether. To complete the reaction the whole is heated for an hour in a bath at 55° C. The reaction mixture is decomposed while cooling with 350 parts by volume of 2 normal sulfuric acid, the ether is distilled from the separated ether layer, 7 parts by weight of 2:5-dichloro-benzene-sulfonic acid are added to the residue and the whole heated to 140° C. while stirring. After cooling, the whole is taken up in ether, filtered and the ether solution washed with dilute sodium carbonate solution, dried with magnesium sulfate and after concentration there is obtained 1-thienyl-3-methyl-indene as an almost colorless oil boiling at 93° C. under a pressure of 0.03 mm.

Example 7

36 parts by weight of 1-(2'-chlorophenyl)-3-methyl-indene and 21 parts by weight of β-chlorethyl-diethylamine are dissolved in 150 parts by volume of toluene and 8 parts by weight of finely ground sodamide added. The reaction is initiated by heating to 50 to 60° C. Subsequently the temperature is maintained below 90° C. by cooling and for completion of the reaction the whole finally heated under reflux for 15 minutes. Working up takes place as described in Example 1. There is obtained by distillation at 140–141° C. under 0.035 mm. pressure the 1-(β-diethylamino-ethyl) - 1 - (2' - chlorophenyl)-3-methyl-indene of the formula

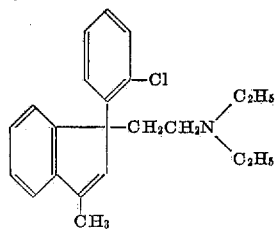

This indene compound can be converted into the corresponding indane derivative by dissolving 20 parts by weight thereof in 80 parts by volume of glacial acetic acid and, after the addition of 4 parts by weight of palladium-carbon (5 percent Pd) shaking in a hydrogen atmosphere at a temperature of 18–20° C. After the taking up of one equivalent of hydrogen, the hydrogenation velocity falls to less than one-tenth of that initially obtaining. After the taking up of about 1700 parts by volume, the hydrogenation is interrupted and working up carried out as in Example 4. By fractional distillation, after a small first running, there is obtained as main product the 1-(β-diethylamino-ethyl)-1-(2'-chlorophenyl)-3-methyl-indane of the formula

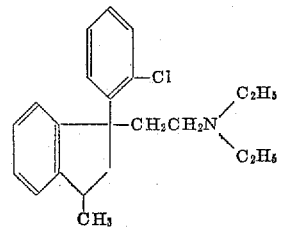

as a colorless oil of boiling point 140° C. under 0.04 mm. pressure.

The 1-(2'-chloro-phenyl) - 3 - methyl-indene, used as starting material, which boils at 112° C. under 0.09 mm. pressure, can be obtained in an analogous manner to that described in Example 3 by reacting 62 parts by weight of 1-(o-chlorophenyl)-indane-3-on dissolved in 70 parts by volume of toluene with a Grignard solution prepared from 8 parts by weight of magnesium dissolved in 250 parts by volume of ether by the introduction of methyl-bromide and working up as indicated in Example 3.

Example 8

When in Example 7 the 1-(2-chlorophenyl)-3-methyl-indene is replaced by 1-(4-chlorophenyl)-3-methyl-indene of melting point 64° C. (obtained from 97 parts by weight of 3-(p-chlorophenyl)-indane-3-on dissolved in 100 parts by volume of toluene and a Grignard solution prepared from 12 parts by weight of magnesium in 400 parts by volume of ether by introduction of methyl-bromide according to the method described in Example 7) there is obtained the 1-(β-diethylamino-ethyl)-1-(4'-chlorophenyl)-3-methyl-indene of the formula

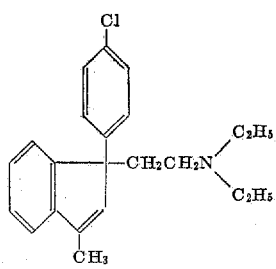

It boils under 0.05 mm. pressure at 150° C. From this, by the hydrogenation method set forth in Example 7, there can be obtained the 1-(β-diethylamino-ethyl)-1-(4'-chlorophenyl)-3-methyl-indane of the formula

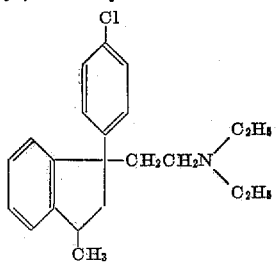

of boiling point 138° C. (under 0.03 mm. pressure).

Example 9

23 parts by weight of 1-methyl-3-benzyl-indene and 14 parts by weight of β-chlorethyl-diethylamine are dissolved in 100 parts by volume of toluene and 6 parts by weight of finely ground sodamide added. The reaction is initiated by heating to 55° C. and, when the evolution of heat subsides, is completed by short heating under reflux. After working up in the manner set forth in Example 1, the 1-(β-diethylamino-ethyl)-1-methyl-3-benzyl-indene is obtained as a practically colorless oil of boiling point 134° C. under 0.05 mm. pressure.

16 parts by weight of this benzyl-methyl-indene base are dissolved in 60 parts by volume of glacial acetic acid and after the addition of 4 parts by weight of palladium carbon (5 percent Pd), shaken at room temperature in a hydrogen atmosphere. After the taking up of one equivalent of hydrogen, working up is carried on as described in Example 4, whereupon 1-(β-diethylamino-ethyl)-3-benzyl-1-methyl-indane of the formula

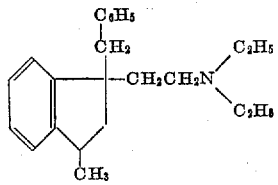

distils as a colorless oil at 131° C. under 0.05 mm. pressure.

The 1-methyl-3-benzyl-indene used in this example may be prepared in the following way:

A solution of 8 parts by weight of potassium hydroxide in 110 parts by volume of methanol of 90 percent strength are added while stirring to 33 parts by weight of 3-methyl-indene and 35 parts by volume of benzaldehyde, the temperature rising from 22° to 38° C. The whole is then heated for a further ½ hour at 40° C. and rendered acid with dilute sulfuric acid. The oily layer is taken up in benzene and the benzene solution washed consecutively with water and dilute sodium carbonate solution. After drying, the benzene solution is fractionally distilled in vacuo. 40 parts by weight of the 1-benzal-3-methyl-indene obtained as main product of boiling point 126° C. under 0.06 mm. of pressure are dissolved in 100 parts by volume of dioxane, 10 parts by weight of Rupe nickel are added and then a solution of 11 parts by weight of potassium hydroxide in 100 parts by volume of methanol are added in a hydrogen atmosphere and agitated. After the taking up of one equivalent of hydrogen, the hydrogenation velocity falls to a fraction of that initially obtaining. The hydrogenation is interrupted, the whole acidified with acetic acid, filtered from the catalyst, the majority of the solvents removed in vacuo, the oily portions of the concentrated hydrogenated product are taken up in ether and the ethereal solution washed neutral. From the dried ethereal solution there is obtained by distillation the 1-methyl-3-benzyl-indene boiling at 93° C. under 0.03 mm. pressure.

*Example 10*

24 parts by weight of 1-phenyl-3-isopropyl-indene are reacted with 15 parts by weight of β-chloro-ethyl-diethylamine in 100 parts by volume of toluene while adding 6 parts by weight of finely ground sodamide. The whole is finally heated for 2 hours under reflux. After working up as described in Example 1, there is obtained 1-(β-diethylamino-ethyl)-1-phenyl-3-isopropyl-indene of the formula

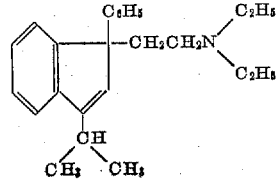

in the form of a yellowish oil boiling at 131° C. under 0.03 mm. pressure.

By hydrogenating 20 parts by weight of 1-(β-diethylamino-ethyl)-1-phenyl-3-isopropyl-indene dissolved in 145 parts by volume of ethanol while adding 10 parts by weight of Rupe nickel at an initial pressure of 7.5 atmospheres of hydrogen and at a hydrogenation temperature of 95°–100° C. there is obtained the 1-(β-diethylamino-ethyl)-1-phenyl-3-isopropyl-indane of the formula

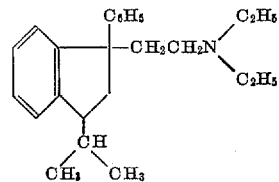

boiling at 129° C. under 0.03 mm. pressure.

The 1-phenyl-3-isopropyl-indene used as starting material can be prepared as follows:

84 parts by weight of 1 phenyl-indene dissolved in 300 parts by volume of acetone are mixed with a solution of 4 parts by weight of potassium hydroxide in 20 parts by volume of methanol and heated for 1½ hours under reflux. The reaction mixture rendered neutral with dilute sulfuric acid and concentrated in vacuo is taken up in benzene, from which solvent after the addition of petrol ether the 1-phenyl-3-isopropylidene-indene melting at 98° C. crystallises.

To 72 parts by weight of this 1-phenyl-3-isopropylidene-indene dissolved in 220 parts by volume of methanol there are added 19 parts by weight of potassium hydroxide, 15 parts by weight of Rupe nickel being added in a hydrogen atmosphere, and agitated. After the taking up of one equivalent of hydrogen, the hydrogenation velocity falls abruptly; the whole is rendered neutral with acetic acid, filtered, and from the filtrate concentrated in vacuo, by taking up in ether, washing and drying the ether and subsequent distillation there is obtained the 1-phenyl-3-isopropyl-indene boiling at 102° C. under 0.03 mm. pressure.

*Example 11*

45 parts by weight of 1-phenyl-3-benzyl-indene are reacted with 25 parts by volume of β-chloro-ethyl-diethylamine in 150 parts by volume of toluene with 8.5 parts by weight of finely ground sodamide at about 80° C. and finally heated for one hour at 100–105° C. The working up takes place as described in Example 1. There is thus obtained the 1-(β-diethylamino-ethyl)-1-phenyl-3-benzyl-indene of the formula

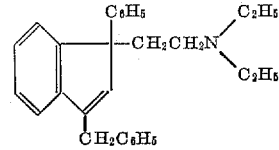

boiling at 170° C. under 0.035 mm. pressure.

For hydrogenation 20 parts by weight of 1-(β-diethylamino-ethyl)-1-phenyl-3-benzyl-indene are dissolved in 80 parts by volume of glacial acetic acid and shaken with 4 parts by weight of palladium carbon (5 percent Pd) in a hydrogen atmosphere until the taking up of hydrogen is completed. Working up takes place as described in Example 4. There is thus obtained the 1-(β-diethylamino-ethyl)-1-phenyl-3-benzyl-indane of the formula

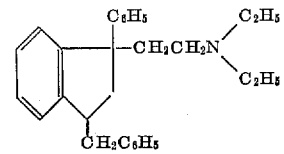

as a colorless, viscous oil boiling at 176° C. under 0.035 mm. pressure.

The 1-phenyl-3-benzyl-indene used as starting material can be obtained by replacing the 1-methyl-indene in the benzaldehyde condensation of Example 9 by 50 parts by weight of 1-phenyl-indene and hydrogenating the 1-phenyl-3-benzal-indene of boiling point 184° C. under 0.05 mm. pressure thus obtained under the conditions described in Example 9 with 1.4-addition in a strongly alkaline medium. It distills at 153° C. under 0.04 mm. pressure of mercury.

*Example 12*

5 parts by weight of finely ground sodamide are added to 18 parts by weight of 1:3-dibenzyl-indene and 12 parts by weight of β-chloro-ethyl-diethylamine in 120 parts by volume of toluene. The reaction is initiated by heating to about 100° C. The whole is heated for a further 1½ hours under reflux. After working up according to the method described in Example 1 there is obtained the 1:3-dibenzyl-1-(β-diethylamino-ethyl)-indene of the formula

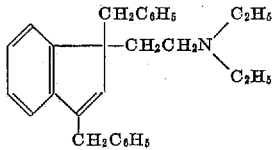

as a yellowish oil boiling at 190° C. under 0.05 mm. pressure. By neutralising the base with dilute hydrochloric acid and concentrating the aqueous solution there crystallises a hydrochloride containing crystal water of melting point 94–96° C.

By agitating 10.5 parts by weight of 1:3-dibenzyl-1-(β-diethylamino-ethyl)-indene dissolved in 45 parts by volume of glacial acetic acid while adding 4 parts by weight of palladium-carbon (5 percent Pd) in a hydrogen atmosphere at room temperature there is obtained the 1:3-dibenzyl-1-(β-diethylamino-ethyl)-indane of the formula

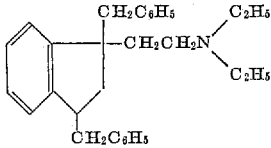

as a colorless oil boiling at 180° C. under 0.03 mm. pressure.

*Example 13*

29 parts by weight of 1-benzyl-3-furfuryl-indene and 14 parts by weight of β-chloroethyl-diethylamine dissolved in 100 parts by volume of toluene are reacted with 5.5 parts by weight of finely ground sodamide and after stirring for one hour at 100–110° C. worked up as described in Example 1. There is thus obtained the 1-(β-diethylamino-ethyl)-1-benzyl-3-furfuryl-indene of the formula

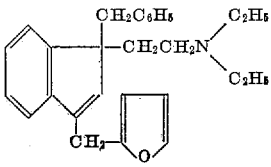

as a viscous yellowish oil boiling at 168° C. under 0.04 mm. pressure.

The 1-benzyl-3-furfuryl-indene used as starting material can be obtained by condensing 42 parts by weight of 1-benzyl-indene with 20 parts by weight of furfurol dissolved in 150 parts by volume of methanol with 15 parts by volume of caustic potash solution of 40 percent strength in the way described in Example 9. There is thus results 1-benzyl-3-furfurylidene-indene which is obtained from a mixture of benzene and petrol ether in yellow crystals melting at 121.5° C. 28 parts by weight of the latter are dissolved in 200 parts by volume of dioxane and after adding 10 parts by weight of Rupe nickel and 7 parts by weight of potassium hydroxide dissolved in 200 parts by volume of methanol, are shaken in a hydrogen atmosphere at a temperature of 22–27° C. After working up in the manner described in Example 9 there is obtained 1-benzyl-3-furfuryl-indene boiling at 92° C. under a pressure of 0.08 mm. of mercury.

*Example 14*

40 parts by weight of 1:3-diphenyl-indene and 21 parts by weight of β-chloroethyl-diethylamine dissolved in 150 parts by volume of toluene are reacted with 8 parts by weight of sodamide and after the spontaneous reaction has subsided heated for a further ¼ hour under reflux. After working up as described in Example 1, there is obtained the 1-(β-diethylamino-ethyl)-1:3-diphenyl-indene of the formula

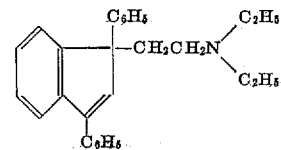

boiling at 181° C. under a pressure of 0.05 mm.

20 parts by weight of 1-(β-diethylamino-ethyl)-1:3-diphenyl-indene are hydrogenated in 60 parts by volume of glacial acetic acid with 3 parts by weight of palladium-carbon (5 percent Pd) at a temperature of 20–23° C. to 1-β-diethylamino-ethyl)-1:3-diphenyl-indane of the formula

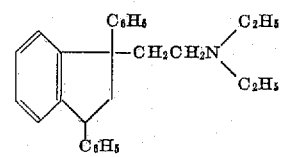

which after working up as described in Example 4 results as a colorless oil boiling at 171° C. under 0.05 mm. pressure.

*Example 15*

23 parts by weight of 1-phenyl-2:3-dimethyl-indene and 14.5 parts by weight of β-chloroethyl-diethylamine are dissolved in 100 parts by volume of toluene and 6 parts by weight of finely ground sodamide are added. The reaction begins at about 50° C.; the temperature is kept below 80° C. by cooling. Finally the whole is heated for a further ¼ hour under reflux. After cooling 10 parts by volume of alcohol are added and the reaction mixture decomposed by the addition of water. From the toluene solution separated off the basic portions are removed by agitation with dilute hydrochloric acid, and from the hydrochloride solution by alkalisation with caustic soda solution, extraction with ether and distillation there is obtained the 1-(β-diethylamino-ethyl)-1-phenyl-2:3-dimethyl-indene of the formula

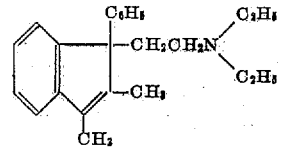

as a pale yellow oil boiling at 127° C. under 0.05 mm. pressure.

10 parts by weight of 1-(β-diethylamino-ethyl)-1-phenyl-2:3-dimethyl-indene dissolved in 40 parts by volume of glacial acetic acid are shaken with 3 parts by weight of palladium-carbon (5 percent Pd) in a hydrogen atmosphere at room temperature. After working up in the usual way there is obtained the 1-(β-diethylamino-ethyl)-1-phenyl-2:3-dimethyl-indane of the formula

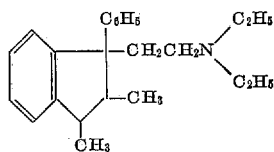

boiling at 126° C. under 0.04 mm. pressure.

By neutralising an alcoholic solution of this base with hydrochloric acid and concentrating the neutral solution there is obtained the hydrochloride of this compound as colorless crystals melting at 217° C.

1-phenyl-2:3-dimethyl-indene can be prepared as follows:

35 parts by weight of 2-methyl-3-phenyl-indanone boiling at 114° C. under 0.07 mm. pressure (prepared from 49 parts by weight of β:β-diphenyl-isobutyric acid, 15 parts by volume of thionyl chloride or 46 parts by weight of aluminium chloride according to the method described in Example 4 for 3-phenyl-5:6-dimethoxy-indanone), dissolved in 70 parts by volume of toluene are added to a Grignard solution prepared from 6 parts by weight of magnesium in 180 parts by volume of ether by introduction of methylbromide. Thereupon the whole is heated for a further hour under reflux, and decomposed with ice while adding 20 parts by volume of concentrated sulfuric acid. 4 parts by weight of 2:5-dichloro-benzene-sulfonic acid are added to the separated solution of ether and toluene and the mixture heated for 10 minutes at 140° C. after the solvent has been distilled off. The whole is taken up in ether, filtered and by distillation there is obtained the 1-phenyl-2:3-dimethyl-indene boiling at 87° C. under 0.04 mm. pressure which when recrystallised from dilute alcohol melts at 52° C.

*Example 16*

To 29 parts by weight of 1-phenyl-3-methyl-indene dissolved in 20 parts by volume each of dioxane and t-butanol there are added 4 parts by volume of t-butanolic solution of 35 percent strength of benzyl-trimethyl-ammonium hydroxide and while cooling at a reaction temperature of 33 to 39° C. a solution of 10 parts by volume of acrylonitrile in 5 parts by volume each of dioxane and t-butanol are gradually stirred in. When the evolution of heat has subsided the reaction mixture is weakly acidified with acetc acid, diluted with ether, filtered, washed consecutively with water and then with dilute sodium carbonate solution, dried with sodium sulfate and fractionally distilled. 71 parts by weight of the 1-phenyl-1-(β-cyanoethyl)-3-methyl-indene boiling at 144° C. under 0.05 mm. pressure thus obtained are dissolved in 100 parts by volume of dioxane and 120 parts by volume of methanol, and after adding 10 parts by weight of Raney nickel and 5 parts by weight of potassium hydroxide, are shaken in a hydrogen atmosphere, keeping the temperature below 29° C. The hydrogenation comes to a standstill after taking up about 12,000 parts by volume of hydrogen and, after working up in the usual way, there is obtained the 1-phenyl-1-(γ-aminopropyl)-3-methyl-indene of the formula

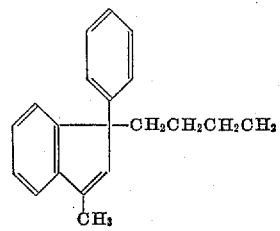

boiling at 126° C. under a pressure of 0.02 mm.

42 parts by weight of this indene base are dissolved in 140 parts by volume of ethanol and after the addition of 20 parts by weight of Rupe nickel hydrogenated in a closed vessel at a temperature of 85 to 90° C. and a hydrogen pressure of 10 atmospheres. The hydrogenation comes to a standstill after taking up one equivalent of hydrogen. After filtering off the catalyst there is obtained by distillation the 1-phenyl-1-(γ-aminopropyl)-3-methyl-indane of the formula

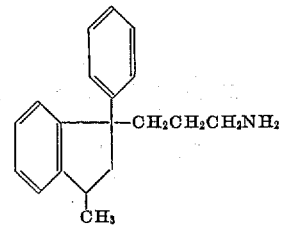

boiling at 126° C. under 0.03 mm. pressure.

16 parts by weight of this primary indane base are dissolved in 80 parts by volume of dioxane and after the addition of 70 parts by volume each of formaldehyde solution of 36 percent strength and formic acid of 85 percent strength heated gradually to 125° C. in the course of 5 hours and heated at the boil for 6 hours under reflux. The whole is then concentrated on a boiling water bath in vacuo, 70 parts by volume of 2 normal hydrochloric acid are added and the whole extracted by agitation with benzene. The acid solution separated off is rendered alkaline with caustic soda solution and the 1-phenyl-1-(γ-dimethylamino-propyl)-3-methly-indane of the formula

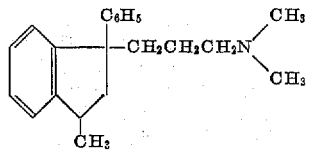

separating off is taken up in benzene and by distillation is obtained as a colorless oil boiling at 133° C. under 0.08 mm. pressure.

18 parts by weight of 1-phenyl-1-(γ-amino-propyl)-3-methyl-indane are dissolved in 40 parts by volume of acetic acid of 50 percent strength and at a reaction temperature below 40° C. a solution of 5.5 parts by weight of sodium nitrite in 8 parts by volume of water is squirted in. The reaction mixture is then slowly heated to 80–90° C. and kept at that temperature for 2 hours. After cooling and the addition of 100 parts by volume of 2 normal hydrochloric acid, the whole is extracted with ether, the ethereal solution washed with 2-normal caustic soda solution and the ether distilled off; to the product remaining behind there is added 10 parts by weight of potassium hydroxide in 30 parts by volume of methanol and the whole is heated for ½ hour under reflux. The methanol is then removed in vacuo, the residue extracted with ether and the ethereal solution concentrated after drying. There is thus obtained the 1-phenyl-1-(γ-hydroxy-propyl)-3-methyl-indane, which boils at 145° C. under 0.09 mm. pressure.

11 parts by weight of 1-phenyl-1-(γ-hydroxy-propyl)-3-methyl-indane are mixed with 4 parts by volume of pyridine and while cooling 5.2 parts by volume of thionyl chloride are stirred in and the mixture heated to 110° C. for 10 minutes. After cooling, dilute hydrochloric acid is added, the whole extracted with ether, the ethereal solution dried with calcium chloride. From the ethereal solution there is obtained by distillation the 1-phenyl-1-(γ-chloro-propyl)-3-methyl-indane boiling at 131° C. under 0.035 mm. pressure. 8 parts by weight of this 1-phenyl-1-(γ-chloro-propyl)-3-methyl-indane are heated with 50 parts by volume of piperidine for 5 hours under reflux. The cooled reaction mixture is rendered acid with dilute hydrochloric acid and extracted with ether by agitation, the aqueous acid phase is rendered alkaline with caustic soda solution and again extracted with ether. From the alkaline ethereal extract there is obtained by distillation the 1-phenyl-1-(γ-N-piperidino-propyl)-3-methyl-indane of the formula

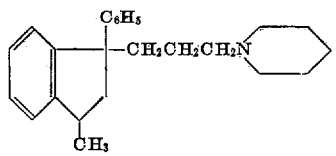

as a colorless oil boiling at 147° C. under 0.05 mm. pressure.

*Example 17*

To 40 parts by weight of 3-methyl-indene and 110 parts by volume of cyclohexanone there is added a solution of 1 part by weight of potassium hydroxide in 10 parts by volume of methanol in a nitrogen atmosphere and heated while stirring for 1 hour in a bath at 70° C. then for 2 hours in a bath at 120° C. After cooling, 10 parts by volume of 6-normal hydrochloric acid are added, the majority of the cyclohexanone used in excess is removed in vacuo, the residue is dissolved in benzene, water being added, the benzene solution is separated off and dried and the solvent distilled off from the 1-cyclohexylidene-3-methyl-indene which is obtained in crystalline form. Redissolved from hexane it melts at 72–73° C.

21 parts by weight of 1-cyclohexylidene-3-methyl-indene dissolved in 60 parts by volume of toluene are stirred with 5.5 parts by weight of finely ground sodamide and a solution of 14 parts by volume of β-chloro-ethyl-diethyl-amine in 30 parts by volume of toluene are added at 70–80° C. The whole is then heated for one hour under reflux. After cooling, the reaction mixture is decomposed by stirring in 10 parts by volume of alcohol and then water until the components dissolve. The toluene layer is separated off, the basic portions are removed by extraction with dilute hydrochloric acid, these portions being then set free again by rendering the hydrochloric solution alkaline and taken up in ether. From the dried ethereal solution there is obtained by distillation the 1-cyclohexenyl - 1 - (β - diethyl - amino - ethyl) - 3 - methyl-indene of the formula

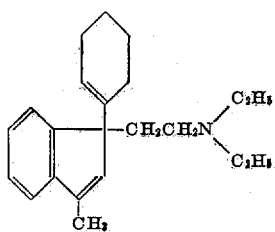

which boils at 125° C. under 0.04 mm. pressure.

7 Parts by weight of 1-cyclohexenyl-1-(β-diethylamino-ethyl)-3-methyl-indene are dissolved in 40 parts by volume of glacial acetic acid and after the addition of 2 parts by weight of palladium carbon (10 percent Pd) hydrogenated at a temperature of 45° C. After taking up two equivalents of hydrogen and working up in the usual manner there is obtained the 1-cyclohexyl-1-(β-diethylamino-ethyl)-3-methyl-indane of the formula

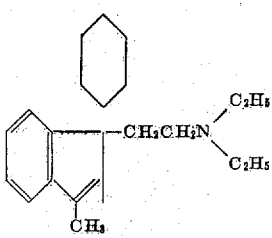

as a colorless oil boiling at 122° C. under 0.05 mm. pressure.

*Example 18*

In the manner described in Example 17, 30 parts by weight of 1-cyclohexylidene-3-methyl-indene in 100 parts by volume of toluene are reacted with 21 parts by volume of N-(β-chloro-ethyl)-piperidine in 30 parts by volume of toluene and 7.5 parts by weight of sodamide. There is thus obtained the 1-cyclo-hexenyl-1-(β-N-piperidino-ethyl)-3-methyl-indene of the formula

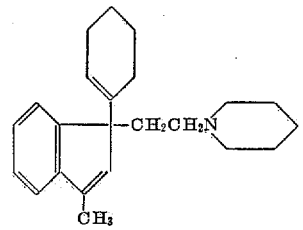

which boils at 144° C. under 0.03 mm. pressure.

20 parts by weight of this base are dissolved in 100 parts by volume of alcohol and agitated with 3 parts by weight of palladium carbon (10 percent Pd) at a temperature of 45° C. in a hydrogen atmosphere. After taking up one equivalent of hydrogen the hydrogenation comes to a standstill. By filtering off the catalyst and distillation there is obtained the 1-cyclohexyl-1-(β-N-piperidino-ethyl)-3-methyl-indene of the formula

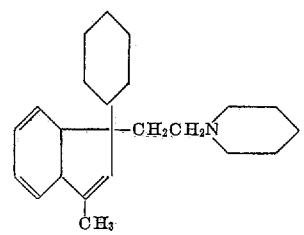

which boils at 138° C. under 0.035 mm. pressure.

When the hydrogenation of the 20 parts by weight of 1 - cyclohexenyl - 1 - (β - N - piperidino - ethyl) - 3-methyl-indene is carried out in 100 parts by volume of glacial acetic acid instead of in alcohol as described above but otherwise under the same conditions, there is obtained after taking up two equivalents of hydrogen the 1-cyclohexyl-1-(β-N-piperidino-ethyl)-3-methyl-indane of the formula

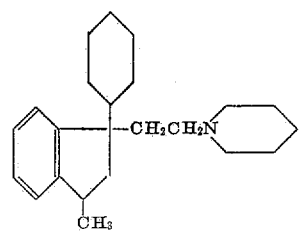

as a colorless oil boiling at 140° C. under 0.05 mm. pressure.

The same compound is also obtained when the aforementioned 1 - cyclohexyl - 1 - (β - N - piperidino-ethyl) - z-methyl-indene dissolved in glacial acetic acid is hydrogenated with palladium carbon at 45° C.

*Example 19*

130 parts by volume of α-mono-allyl-benzyl-cyanide are added in portions to a mixture of 170 parts by weight of fine-grained aluminium chloride and 120 parts by volume of n-hexane while stirring at a temperature of 40 to 52° C. When the evolution of heat subsides, the reaction temperature is kept between 50 and 60° C. by external cooling. The reaction mixture is then decomposed by pouring on to ice and stirring while adding chloroform. The separated chloroform solution is washed with water, then with dilute sodium carbonate solution and dried with calcium chloride. By distillation there is obtained the 3-methyl-indane-1-carboxylic acid nitrile as a colorless oil boiling at 72° C. under 0.05 mm. pressure.

38 parts by weight of 3-methyl-indane-1-carboxylic acid nitrile and 36 parts by weight of β-chloro-ethyl-diethylamine are dissolved in 180 parts by volume of toluene and 16 parts by weight of finely ground sodamide are stirred in in portions, the temperature being kept at 65 to 75° C. After the addition of the sodamide has been completed, the whole is heated for another ¼ hour at 100° C. After cooling, 10 parts by volume of alcohol are added to the reaction mixture and the latter is decomposed by adding a large quantity of water. From the separated toluene solution the basic portions are removed by extraction with dilute hydrochloric acid. From the hydrochloric extract there is obtained by rendering alkaline with caustic soda solution, extraction with ether and distillation of the ethereal solution the 1-(β-diethylamino-ethyl)-3-methyl-indane-1-carboxylic acid nitrile of the formula

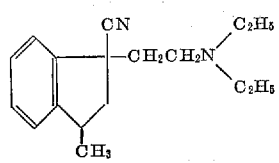

as a colorless oil boiling at 114° C. under 0.09 mm. pressure.

18.5 parts by weight of 1-(β-diethylamino-ethyl)-3-methyl-indane-1-carboxylic acid nitrile are heated with 12 parts by volume of water and 27 parts by volume of concentrated sulfuric acid for one hour at 145 to 150° C. Then a total of 1500 parts by volume of ethanol of 99.8 percent strength are slowly introduced at a temperature of 103-108° C. while stirring into the lower part of the reaction vessel, while alcohol is continuously distilled again from the reaction mixture. Finally the whole is heated for a short time at 125° C. After cooling, the reaction mixture is diluted with 300 parts by volume of ether and ammonia gas is introduced while cooling until the reaction is alkaline. From the separated and dried ethereal solution there is obtained by distillation the 1-(β-diethylamino-ethyl)3-methyl-indane-1-carboxylic acid ethyl ester of the formula

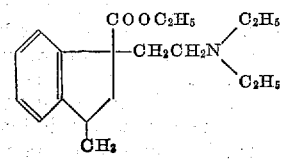

as a colorless oil boiling at 102° C. under a pressure of 0.04 mm. of mercury. The hydrochloride of this compound (prepared from the alcoholic solution of the base neutralised with hydrochloric acid by concentration of the solution and recrystallisation from acetone) melts at 162–164° C.

When 13 parts by weight of 1-(β-diethylamino-ethyl)-3-methyl-indane-1-carboxylic acid nitrile dissolved in 50 parts by volume of toluene are added to a Grignard solution prepared from 3.5 parts by weight of magnesium and 10.5 parts by volume of ethyl-bromide in 50 parts by volume of ether and the reaction mixture is heated while distilling off the ether and the toluene, finally for 3 hours in a bath at 140° C. there is obtained after working up in the usual manner the 1-propionyl-1-(β-diethylamino-ethyl)-3-methyl-indane of the formula

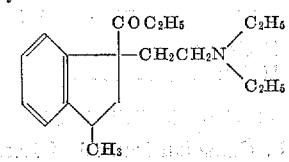

boiling at 99.5° C. under 0.03 mm. pressure.

When in the above described reaction the ethyl-bromide of the Grignard components is replaced by 13 parts by volume of bromo-benzene there is obtained under the described reaction conditions the 1-benzoyl-1-(β-diethylamino-ethyl)-3-methyl-indane of the formula

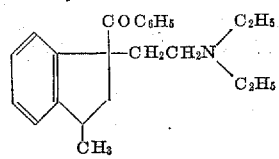

boiling at 142° C. under 0.03 mm. pressure.

Example 20

12 parts by weight of 1-methyl-3-(2'-ethyl-butyl)-indene are reacted with 7 parts by weight of β-chloro-ethyl-diethylamine in 50 parts by volume of toluene after the addition of 3 grams of finely ground sodamide. After heating for one hour to 100–110° C. working up is carried out as described in Example 1. There is thus obtained the 1-(β-diethyl-amino-ethyl)-1-methyl-3-(2'-ethyl-butyl)-indene of the formula

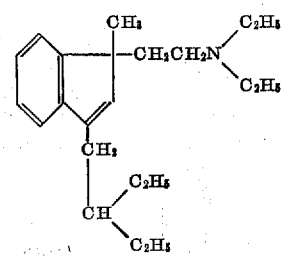

boiling at 112° C. under 0.045 mm. pressure.

5 parts by weight of the latter indene base are dissolved in 20 parts by volume of glacial acetic acid and after the addition of 1 part by weight of palladium carbon (5 percent Pd) shaken in a hydrogen atmosphere. By working up as described in Example 11 there is obtained the 1-(β-diethylamino-ethyl)-1-methyl-3 - (2'-ethyl - butyl)-indane of the formula

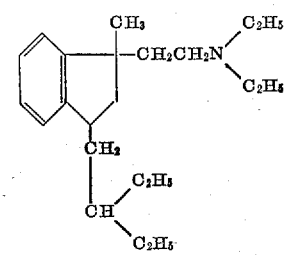

boiling at 115° C. under 0.03 mm. pressure.

The 1-methyl-3-(2'-ethyl-butyl)-indene used as starting material can be obtained by replacing the benzaldehyde in Example 9 by 33 parts by weight of diethylacetaldehyde and hydrogenating 17 parts by weight of the 1-methyl-3-(2'-ethyl-butylidene)-indene of boiling point 87° C. under 0.04 mm. pressure thus obtained in 40 parts by volume of dioxane with 10 parts by weight of Rupe nickel and 4 parts by weight of potassium hydroxide in 80 parts by volume of methanol in a hydrogen atmosphere (the hydrogenation is interrupted after the hydrogenation velocity has fallen to one-sixth of that initially obtaining). 1-methyl-3-(2'-ethyl-butyl)-indene boils at 145–150° C. under 10 mm. pressure.

Example 21

To 17 parts by weight of 1-(α-pyridyl)-3-methyl-indene dissolved in 80 parts by volume of toluene there are added 5 parts by weight of finely ground sodamide. The mixture warms to about 60° C. A solution of 15 parts by volume of β-chloro-ethyl-diethylamine in 15 parts by volume of toluene is then added. The reaction proper begins only at 70° C., and while adding the chloroethyl-diethylamine solution this temperature is maintained. The whole is then slowly heated to 110° C. and stirred for a further 20 minutes at that temperature. Working up is carried out as described in Example 1. By fractional distillation there is obtained the 1-(β-diethyl-amino-ethyl)-1-(α-pyridyl)-3-methyl-indene as a yellowish oil boiling at 130–133° C. under a pressure of 0.03 mm. of the formula

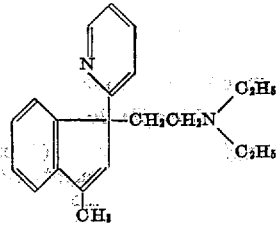

8 parts by weight of 1-(β-diethylamino-ethyl)-1-(α-pyridyl)-3-methyl-indene are dissolved in 50 parts by volume of ethanol and after the addition of 3 parts by weight of palladium carbon at 40–45° C. shaken in a hydrogen atmosphere. After taking up 650 parts by volume of hydrogen the hydrogenation velocity falls to less than ten parts by volume per hour; hydrogenation is interrupted and there is obtained after filtering off the catalyst and by distillation the 1-(β-diethylamino-ethyl)-1-(α-pyridyl)-3-methyl-indane of the formula

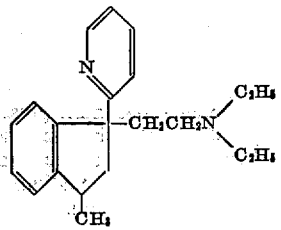

as a colorless oil boiling at 128° C. under a pressure of 0.05 mm.

The starting material can be obtained as follows: 120 parts by weight of 1-methyl-indene and 53 parts by weight of α-bromo-pyridine are reacted in 100 parts by volume of toluene with 16 parts by weight of finely ground sodamide in portions, the temperature being kept at 75–78° C. whilst adding the sodamide. The temperature is then increased to 110° C. within an hour and during a further hour kept at 100–110° C. After cooling, the reaction mixture is decomposed by the addition of 10 parts by volume of alcohol and then by adding water. The separated aqueous layer is extracted with ether and the ethereal extract added to the organic layer; from the latter the basic portions are removed by agitation with dilute hydrochloric acid. From the hydrochloric solution there is obtained by rendering alkaline with caustic soda solution, extraction with ether, drying of the ethereal solution with potassium carbonate and finally by distillation the 1-(α-pyridyl)-3-methyl-indene boiling at 107° C. under 0.2 mm. pressure.

*Example 22*

When the β-chloro-ethyl-diethylamine in the sodamide condensation of Example 1 is replaced by 12 parts by weight of β-chloro-ethyl-dimethylamine and the condensation is carried out in the manner described, there is obtained the 1 - (β - dimethylamino-ethyl)-1-phenyl-3-methyl-indene of the formula

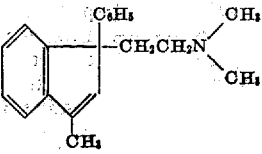

boiling at 130° C. under 0.05 mm. pressure, and from the latter by hydrogenation under the conditions given in Example 1 there is obtained the 1-(β-dimethylamino-ethyl)-1-phenyl-3-methyl-indane of the formula

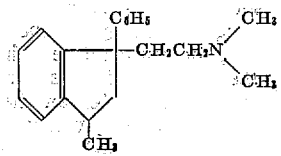

boiling at 126° C. under 0.05 mm. pressure.

*Example 23*

When the 1-phenyl-3-methyl-indene in Example 1 is replaced by 22 parts by weight of 1-phenyl-3-ethyl-indene there is obtained in the mentioned manner the 1-phenyl-1-(β-diethylamino-ethyl)-3-ethyl-indene of the formula

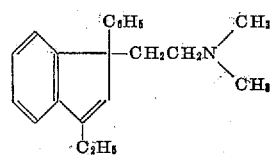

boiling at 133° C. under 0.035 mm. pressure.

By hydrogenation in the manner described in Example 1 there is obtained the 1-phenyl-1-(β-diethylamino-ethyl)-3-ethyl-indane of the formula

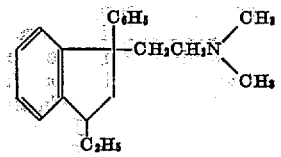

boiling at 127° C. under 0.04 mm. pressure.

1-phenyl-3-ethyl-indene can be obtained as follows: 100 parts by weight of 3-phenyl-indanone dissolved in 150 parts by volume of toluene are gradually added to a Grignard solution prepared from 16 parts by weight of magnesium and 46 parts by volume of ethyl-bromide in 250 parts by volume of ether and the reaction mixture is heated under reflux for a further 2 hours. After cooling, the whole is disintegrated by the addition of dilute sulfuric acid and from the separated solution of ether and benzene there is obtained by distillation the 1-phenyl-3-ethyl-indene boiling at 184° C. under a pressure of 9 mm. mercury.

What is claimed is:

1. A member selected from the group consisting of an unsubstituted, a 5,6-methoxy substituted and a 5,6,3',4'-methoxy-substituted 1-phenyl-1-di-lower alkyl-aminoethyl-3-methyl-indane and the non-toxic therapeutically useful salts thereof.
2. 1-(β-diethylamino-ethyl)-1-phenyl-3-methyl-indane.
3. 1 - (β-diethylamino-ethyl)-1-phenyl-3-methyl-5,6-dimethoxy-indane.
4. 1-(β-diethylamino-ethyl) 1-(3',4'-dimethoxy-phenyl)-3-methyl-5,6-dimethoxy-indane.
5. 1-(β-piperidino-ethyl)-1-phenyl-3-methyl-indane.

References Cited in the file of this patent

UNITED STATES PATENTS

| 2,441,069 | Hoffman | May 4, 1948 |
| 2,479,744 | Hoffman | Aug. 23, 1949 |

OTHER REFERENCES

Gagnon et al.: Canadian Journal of Research, volume 22B, Number 2, pages 32–44.

UNITED STATES PATENT OFFICE
Certificate of Correction

Patent No. 2,798,888                      July 9, 1957

Hellmut Ueberwasser

It is hereby certified that error appears in the printed specification of the above numbered patent requiring correction and that the said Letters Patent should read as corrected below.

Column 2, line 26, for "laterature" read —literature—; lines 60 and 61, for "be converted in a conventional manner by hydrolysis and of resulting 1-aminoalkyl-1-R-3-$R_1$-indenes or -indanes can" read —of resulting 1-aminoalkyl-1-R-3-$R_1$-indenes or -indanes can be converted in a conventional manner by hydrolysis and—; column 3, line 66, and column 4, line 7, for "indene" read —indane—, in each occurrence; column 10, line 22, for "1 phenyl-indene" read —1-phenyl-indene—; column 12, line 33, for "1-$\beta$-diethylamino-ethyl)" read —1-($\beta$-diethylamino-ethyl)—; column 13, line 68, right-hand portion of the formula, for —$CH_2CH_2CH_2CH_2$      read      —$CH_2CH_2CH_2NH_2$ column 14, line 30, for "3-methly-indane" read —3-methyl-indane—; column 15, lines 65 to 73, the formula should appear as shown below instead of as in the patent—

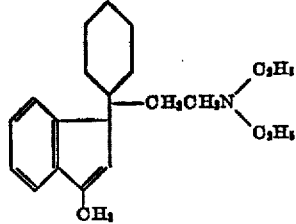

column 16, line 62, for "z-methyl-indene" read —3-methyl-indene—; column 17, line 43, for "($\beta$-diethylamino-ethyl)3-methyl" read —($\beta$-diethylamino-ethyl)-3-methyl—.

Signed and sealed this 5th day of August 1958.

[SEAL]

Attest:
KARL H. AXLINE,
*Attesting Officer.*

ROBERT C. WATSON,
*Commissioner of Patents.*